United States Patent
Obrist et al.

(10) Patent No.: US 9,702,569 B2
(45) Date of Patent: Jul. 11, 2017

(54) METHOD FOR THE TEMPERATURE CONTROL OF COMPONENTS

(71) Applicant: OBLAMATIK AG, Chur (CH)

(72) Inventors: Roland Obrist, Scharans (CH); Edo Lang, Chur (CH); Philipp Triet, Bad Ragaz (CH)

(73) Assignee: OBLAMATIK AG, Chur (CH)

( * ) Notice: Subject to any disclaimer, the term of this patent is extended or adjusted under 35 U.S.C. 154(b) by 0 days.

(21) Appl. No.: 14/773,213

(22) PCT Filed: Mar. 4, 2014

(86) PCT No.: PCT/EP2014/054176
§ 371 (c)(1),
(2) Date: Sep. 4, 2015

(87) PCT Pub. No.: WO2014/135538
PCT Pub. Date: Sep. 12, 2014

(65) Prior Publication Data
US 2016/0025356 A1 Jan. 28, 2016

(30) Foreign Application Priority Data
Mar. 5, 2013 (CH) .................................. CH00542/13

(51) Int. Cl.
*F24D 19/10* (2006.01)
*F24D 3/14* (2006.01)
(Continued)

(52) U.S. Cl.
CPC .......... *F24D 19/1015* (2013.01); *F24D 3/14* (2013.01); *F24D 19/1012* (2013.01);
(Continued)

(58) Field of Classification Search
CPC .... F24D 19/1015; F24D 19/1012; F24D 3/14; F24F 5/0092; F24F 11/001;
(Continued)

(56) References Cited

FOREIGN PATENT DOCUMENTS

DE 102009004319 A1 7/2010
WO 2009072759 A2 6/2009
(Continued)

OTHER PUBLICATIONS

International Search Report and Written Opinion for PCT/EP2014/054176 filed Mar. 4, 2014.
(Continued)

*Primary Examiner* — Ryan Jarrett
(74) *Attorney, Agent, or Firm* — Notaro, Michalos & Zaccaria P.C.

(57) ABSTRACT

A temperature-control system includes a temperature-control device (3), (n≥2) temperature-control assemblies (5, 5') which are designed for conducting a temperature-control fluid (2) through a component (4) to be temperature-controlled, (n≥2) individual return line parts (7', 7") and (n≥2) return temperature sensors (8, 8'), a controller (9) having (n≥2) valves (10, 10') and control elements (11, 11') which are designed to adjust the respective associated valve (10, 10'), and a room temperature sensor (12) for determining and reporting an actual temperature (13) in an immediate environment of the component (4).

15 Claims, 2 Drawing Sheets

Figure 1:
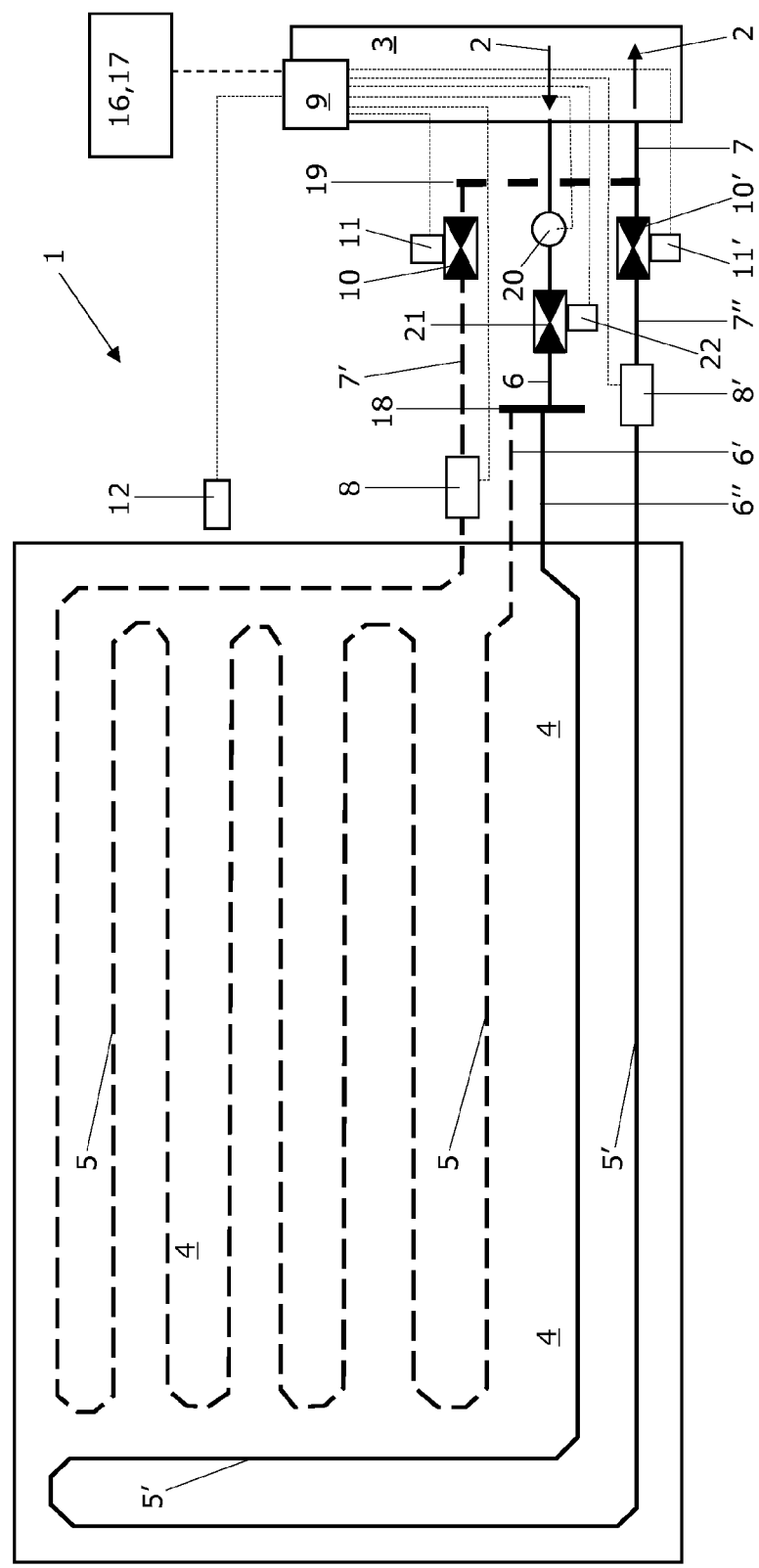

(51) Int. Cl.
   *F24F 5/00*      (2006.01)
   *F24F 11/00*     (2006.01)
   *F24F 11/06*     (2006.01)
   *G05D 23/19*     (2006.01)
(52) U.S. Cl.
   CPC .......... *F24F 5/0089* (2013.01); *F24F 5/0092* (2013.01); *F24F 11/001* (2013.01); *F24F 11/008* (2013.01); *F24F 11/0012* (2013.01); *F24F 11/06* (2013.01); *G05D 23/1931* (2013.01); *F24F 2011/0082* (2013.01); *F24F 2011/0083* (2013.01); *Y02B 30/745* (2013.01)
(58) Field of Classification Search
   CPC .... F24F 11/0012; F24F 11/008; F24F 5/0089; F24F 11/06; F24F 2011/0083; F24F 2011/0082; G05D 23/1931; Y02B 30/745
   See application file for complete search history.

(56)              References Cited

FOREIGN PATENT DOCUMENTS

| WO | 2010095089 A2 | 8/2010 |
| WO | 2010095092 A2 | 8/2010 |
| WO | 2010095093 A2 | 8/2010 |

OTHER PUBLICATIONS

International Preliminary Report on Patentability for PCT/EP2014/054176 filed on Mar. 4, 2014.

METHOD FOR THE TEMPERATURE CONTROL OF COMPONENTS

The invention relates to a temperature-control method for the temperature control, namely the heating and cooling, of a component. Such components include, for example, a floor, a wall or a ceiling of a living space or workspace; isolated heating or cooling walls can also be used. A temperature-control system suitable for this temperature-control method typically consists of a temperature-control device designed to heat or cool a temperature-control fluid and at least two temperature-control assemblies which are designed for conducting a temperature-control fluid through a component to be temperature-controlled, which are connected with the temperature-control device using individual feed line parts and individual return line parts. Each of said individual return line parts has its own return temperature sensor to measure the individual return temperature of the temperature-control fluid from the relevant temperature-control assembly. A controller comprises valves with control elements positioned in the individual feed line parts or return line parts, which are designed to adjust an opening degree of the related valve. This controller is designed to control the control elements and to read the return temperature sensor and comprises a room temperature sensor to calculate and report an ACTUAL temperature in direct proximity to the component.

In temperature-control systems known from the state of the art, the flow rate of the temperature-control fluid is usually adjusted statically using mechanical flow rate control elements. The thermal control elements are designed as two-point controllers and the energy to be transferred from a temperature-control system designed for example as a heating system is normally adjusted by an intricate hydraulic calibration of the TOP meters. These TOP meters are control elements, which statically adjust the flow rate of the temperature-control fluid in a heating circuit consisting of feed, floor heating (=temperature-control assembly) and return. However, the installer requires parameters to adjust the target flow rate.

However, the parameters are influenced by the assumed pipe diameter (sludge sometimes reduces the effective pipe diameter) and the flow pressure (e.g. by opening and closing several parallel lines) of the temperature-control fluid. The resulting feed and return temperature is further affected by the feed temperature and the temperature of the temperature-control assembly. Despite experience and use of extreme caution, it is still only possible to make an imprecise adjustment of the individual lines or heating circuits. This results in an uneven distribution of heat and, more specifically, insufficient energy efficiency. Furthermore, the theoretically calculated control variables are not available for renovations and can only be calculated at great expense. Another problem are the inaccurate room thermostats, which often exert a simple On/Off function on such a floor heating system.

Although there are attempts to more accurately calculate the energy consumption of heating systems (see DE 44 17 941 A1), there is still a lack of concepts that can successfully counteract the significant disadvantages of the aforementioned state of the art.

A method to control an underfloor heating system is known from Document DE 100 57 359 C2, with which a heating circuit of a room is supplied with a heat transfer fluid within a period for a supply period and the supply period is selected depending on the room temperature. As well as the room temperature, at least one further parameter (preferably a thermal time constant of the room) will be recorded and the length of period and length of supply period will be selected on the basis of the room temperature and this parameter. This time constant is a measurement stating how quickly the room heats up upon supply of a defined heat quantity. To determine this thermal time constant of the room, the difference between the return temperature and the feed temperature is determined together with the flow rate of the heat transfer fluid. However, the recording and evaluation of all these parameters is laborious and requires the necessary sensor technology and algorithms.

A device to adjust the heating circuits in large-scale heating systems is known from Document DE 199 11 866 A1. The heating circuits are automatically aligned with one another by stabilising the temperature difference between the feed and return. In any case, the feed and return temperature must be measured. With the objective of compensating the difference between the feed temperature and return temperature for all circuits, individual lines (those with the lowest return temperature) are throttled.

From Document WO 2004/083733 A1, a method to adjust several parallel heat exchangers supplied with a cooling fluid is known. For every heat exchanger, a specific dimension is calculated according to its heat requirement using very time-consuming measurements and complicated calculations. This is then compared with the specific dimension of other heat exchangers. The heat exchanger with the greatest consumption of heat transfer fluid is slowed down by reducing its flow rate. The nozzle opening ratios of the individual heat exchangers are calculated as a specific dimension and compared with one another; heat exchangers with the smallest nozzle opening ratios are slowed down by reducing or stopping their flow rate. The objective is to adjust the nozzle opening ratio of all heat exchangers and their control valves, thus achieving the most even heat consumption possible for all heat exchangers.

From Document DE 10 2006 061 801 A1, a temperature regulating system and its use for cooling or heating is known. The actual internal temperature and the actual humidity of the room is initially recorded in order to cool or heat a room in a building. From these values, a minimal temperature is calculated, which should not be fallen below. On the basis of a calculated minimum feed temperature, a target feed temperature is defined and a mixer unit is activated to regulate the feed temperature; the use of a feed temperature sensor here is normal. Dosing valves are activated in such a way that the actual temperature of the temperature-control fluid of the target feed temperature ultimately corresponds to the actual room temperature of a predefined target room temperature.

From Document WO 2009/072744 A2, a device is known, with which a room temperature is regulated in several rooms adapted to a heating environment. A heating temperature, as defined by a user, is converted into a return control temperature by an individual room controller and transmitted to the valve controller. The valve controller controls the heating volume of the boiler at the instigation of the individual room controller by integrating the return control temperature of each room. The heating volume of the boiler is regulated to the heating volume, at which the highest temperature of the return control temperature of each room, which is defined through the individual room controller, is maintained. If the boiler is now in operation and if the current return control temperature of the boiler is higher than the necessary return control temperature of each room, then the control valve is closed so that the heating system does not overshoot. The boiler is controlled in such a way that it prepares the necessary heating energy which is needed in order to maintain the return control temperature set by the user for each room.

From Document WO 2009/069892 A2, a device is known which controls the temperature of the heating water of each individual room temperature-control system, which makes it possible to maintain similar temperatures on one floor with a multitude of pipes. Return temperature sensors detect the return temperature at the back connection points of the heating pipes in front of the boiler for each heating circuit of a room and transmit the recorded return temperature to an individual room controller. This individual room controller defines the return temperature of the heating water after a user has pre-set the desired room temperature. In addition, the individual room controller calculates the demand of the heat quantity by comparing the return temperature of the heating water selected by the user with the return temperature recorded through the return temperature sensors and defines the opening and closing of the heat control valves individually for each circuit and transmits the defined values to the valve controller.

From Document DE 197 16 863 A1, an underfloor heating system is known with a temperature-control device, which is allocated an empirical consumption recording, which deduces the consumption figures on the basis of the feed and return temperatures and the prevailing room temperature.

From Document DE 10 2006 052 124 A1, an equalisation system is known for an underfloor temperature-control assembly with at least two temperature-control circuits, of which each has a heat transfer pipe fitted either in a floor or a ceiling, consisting of a feed and return. To simplify the distribution of the heat capacity to the individual heating circuits, it is ensured that a return temperature controller is fitted to each return with a temperature sensor that records the temperature in the respective return and that all return temperature controllers exhibit similar temperature-control behaviour. The return temperature controller ensures that the returning heat transfer medium is kept at a predefined temperature.

From Document WO 2009/063407 A1, the control of heating/cooling beneath a surface is known through the provision of two circuits of a heating/cooling system, wherein the flow is high during the work cycle of the system and the flow is stopped when the work cycle of the system is stopped. The room temperature is controlled by controlling the percentages of the work cycles, wherein the percentages are defined on the basis of the heat demand of the rooms. Different circuits are controlled by starting the work cycles at different times.

It is the task of the invention in question to suggest an alternative temperature-control method and a suitable temperature-control system to heat or cool a component to carry out this method, which eliminates or at least minimises the significant disadvantages known from the prior art. It is particularly preferred that this temperature-control method is simple, while still ensuring a considerably more consistent energy output to components or a considerably more consistent energy intake of components, thus increasing the comfort and energy efficiency.

For greater clarity, the heating method and heating systems will mainly be discussed in the following in the context of temperature-control methods and temperature-control systems; but correspondingly, these designs also apply for cooling methods and cooling systems.

According to an initial aspect, this task is solved with a simpler temperature-control method which comprises the characteristics of Claim 1.

According to a second aspect, this task is solved with an improved temperature-control method.

According to a third aspect, this task is solved with a temperature-control system to perform this temperature-control method.

Other preferred and inventive characteristics arise from the dependent Claims.

Figure 2:
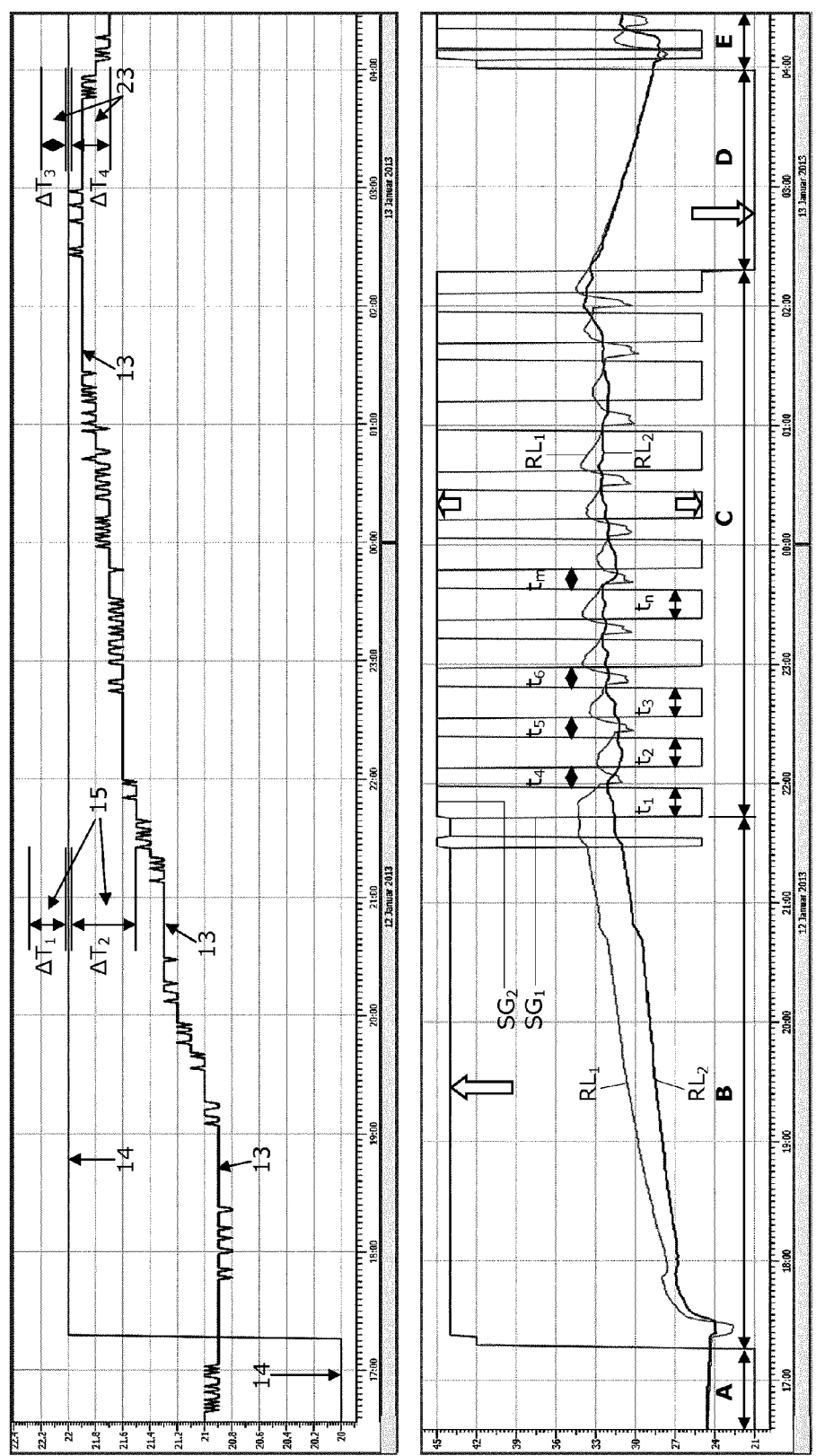

A preferred embodiment of the invention in question will now be explained in more detail on the basis of schematic drawings and diagrams, without these drawings and diagrams limiting the scope of the invention in question. The following is shown:

FIG. 1 A functional diagram of a device suitable for performing the method according to the invention;

FIG. 2 Measured curves and plugging diagrams, which have been obtained with a device as per FIG. 1 during the performance of the method to which the invention relates.

The advantages of the method to which the invention relates comprise:

Optimal heat distribution of the temperature-controlled surfaces;

An improvement in the comfort in the heated rooms;

A fully automated equalisation, meaning automatic optimisation of the heating or cooling system;

The feed temperature sensor is unnecessary, which simplifies the method;

A higher energy efficiency of the heating or cooling system in use through the successful prevention of this system overshooting in relation to a selected TARGET temperature;

Rapid heating or rapid cooling can be performed with fully opened valves with a flow rate of the temperature-control fluid of up to approx. 18 liters/min, because there is no TOP meter to reduce the flow of the temperature-control fluid.

In the following, the method to which the invention relates and a preferred device to perform the method to which the invention relates will be presented in detail with reference to FIG. 1. To perform this method for the temperature control of a component, a temperature-control system 1 is provided, which comprises:

a) a temperature-control device 3 designed to heat or cool a temperature-control fluid 2;

b) at least two temperature-control assemblies 5,5' designed to conduct a temperature-control fluid 2 through a component 4 to be temperature-controlled, which are connected through individual feed line parts 6',6" and through individual return line parts 7',7" with the temperature-control device 3, wherein each of the individual return line parts 7',7" comprises its own return temperature sensor 8,8' to measure the individual return temperature of the temperature-control fluid 2 from the relevant temperature-control assembly 5,5';

c) no feed temperature sensor; and d) a controller 9, which comprises the valves 10,10' with the control elements 11,11' positioned in the individual feed line parts 6',6" or the return line parts 7',7", which are designed to adjust an opening degree of the related valve 10,10', wherein the controller 9 is designed to control the control elements 11,11' and to read the return temperature sensors 8,8' and comprises a room temperature sensor 12 to detect and report an ACTUAL temperature 13 in direct proximity to the component 4.

The method for the temperature control of a component 4, for which such a temperature-control system 1 is provided, is characterised in that:

i) the use of feed temperature sensors being unnecessary, thus no feed temperature sensors being used;
ii) a TARGET temperature 14 being predefined for the direct proximity of the component 4;
iii) an initial temperature window 15 not comprising the predefined TARGET temperature 14 being defined as the first positive temperature difference ($\Delta T_1$) for a cooling of component 4 or as a first negative temperature difference ($\Delta T_2$) for heating of component 4 to the predefined TARGET temperature 14 and being implemented in the controller 9; and
iv) the controller 9 issuing the command to the control element 11 of the temperature-control assembly 5, whose return temperature precedes the return temperatures of the other temperature-control assemblies 5' in the direction of a current temperature change, to close the valve 10 for a first closing time ($t_1$) in the case of an entering of the ACTUAL temperature 13 into the first temperature window 15, caused by the temperature change and recorded by the room temperature sensor 12, wherein the controller 9 issues the command to the control elements 11' of the other temperature-control assemblies 5' to keep the valves 10' open during the first closing time ($t_1$).

The following will describe the uses of a temperature system 1 with (n=2) temperature-control devices 3.

The term "component" is used to describe for example a floor panel, a wall, a ceiling panel or even a free-standing panel or a combination of such construction elements in a living room, workspace, storeroom, refrigeration room and such like. A "temperature-control fluid" is a liquid, a gas or a liquid/gas compound, which is suitable for feeding thermal energy to a component or discharging it from a component. A "temperature-control device" can be a heater, cooling system or air-conditioning system with which the temperature of a suitable temperature-control fluid is influenced. "Temperature-control assemblies" are devices (such as cooling pipe or heating pipe lines, which are installed in a component and flushed through with a temperature-control fluid) to exchange thermal energy between a temperature-control fluid and a component.

The "TARGET temperature for the direct proximity of a component" can be the desired room temperature in a living room, workspace, storeroom, refrigeration room and such like. The "temperature window" is defined in such a way that it can be used for both heating systems and cooling systems; the temperature window does not comprise the predefined TARGET temperature 14 and is divided into a first positive temperature difference ($\Delta T_1$), which is above the TARGET temperature, and a first negative temperature difference ($\Delta T_2$), which is below the TARGET temperature. The "ACTUAL temperature" is the room temperature currently measured by the room temperature sensor.

In cases, in which the ACTUAL temperature enters the first temperature window 15 as a result of a change in temperature, the controller determines on the basis of whether the temperature-control system in question is a heating or cooling system, which heating or cooling circuit exhibits a warmer or cooler return temperature in comparison with the other heating or cooling circuits. In practice, the following scenarios typically arise:

A) The ACTUAL temperature is considerably (e.g. by more than 2° C.) below the TARGET temperature. A heating system begins to heat up the temperature-control fluid and distribute it through the temperature-control assemblies in the component which then consequently heats up. The current change in temperature is consequently a rising temperature and the temperature-control assembly, whose return temperature precedes the return temperatures of the other temperature-control assemblies in the direction of the current change in temperature, is as such the heating circuit with the highest return temperature. In this case, the heating system is triggered as per the invention in question (see Claims 1 to 3).

B) The ACTUAL temperature is close to or corresponds to the TARGET temperature. In this case, a heating system is triggered as per the invention in question (see Claim 4).

C) The ACTUAL temperature is considerably (e.g. by more than 2° C.) above the TARGET temperature. In this case, the capacity of a heating system is reduced (see Claim 5) or completely deactivated.

D) The ACTUAL temperature is considerably (e.g. by more than 2° C.) above the TARGET temperature. A cooling system begins to cool down the temperature-control fluid and distribute it through the temperature-control assemblies in the component. The current change in temperature is consequently a falling temperature and the temperature-control assembly, whose return temperature precedes the return temperatures of the other temperature-control assemblies in the direction of the current change in temperature, is as such the cooling circuit with the lowest return temperature. In this case, the cooling system is triggered as per the invention in question.

E) The ACTUAL temperature is close to or corresponds to the TARGET temperature. In this case, a cooling system is triggered as per the invention in question.

F) The ACTUAL temperature is considerably (e.g. by more than 2° C.) below the TARGET temperature. In this case, the capacity of a cooling system is reduced or completely deactivated.

According to the invention, upon the entry of the ACTUAL temperature into a predefined temperature window, there is determined which of the temperature-control assemblies is preceding the others. This preceding establishes that this temperature-control assembly must only exchange a relatively small amount of thermal energy with the component, therefore sustaining a lower temperature difference to the feed temperature of all the temperature-control assemblies of a system. According to the invention, this preceding temperature-control assembly is slowed down in its effect as a result of the controller issuing the command to the relevant control element to close the valve to the advancing temperature-control assembly. Furthermore, it is characteristic of the invention in question that the other temperature-control assembly, which must seemingly exchange a larger heat quantity, remains unhindered, i.e. its valve remains open. Another characteristic of the invention in question is that the valve for the preceding temperature-control assembly is only closed for a defined period of time, namely a closing time ti.

In the following, for the purposes of greater clarity of the description, it is always assumed that the temperature-control device 3 is designed to heat the temperature-control fluid 2, that in other words this deals with a heating system (e.g. for under-floor heating). References to the relevant applications of the method to which the invention relates for cooling systems will be added in a suitable position and, besides, a specialist will be able to deduce this from the following description.

FIG. 1 shows a temperature-control system 1, which is specifically designed to perform the temperature-control method relating to the invention, comprising:
a) a temperature-control device 3 designed to heat or cool a temperature-control fluid 2;

b) at least two temperature-control assemblies 5,5' designed to conduct a temperature-control fluid 2 through a component 4 to be temperature-controlled, which are connected through individual feed line parts 6',6" and through individual return line parts 7',7" with the temperature-control device 3, wherein each of the individual return line parts 7',7" comprises its own return temperature sensor 8,8' to measure the individual return temperature of the temperature-control fluid 2 from the relevant temperature-control assembly 5,5'; and c) a controller 9, which comprises valves 10,10' with control elements 11,11' positioned in the individual feed line parts 6',6" or return line parts 7',7", which are designed to adjust an opening degree of the related valve 10,10', wherein the controller 9 is designed to control the control elements 11,11' and to read the return temperature sensors 8,8' and comprises a room temperature sensor 12 to detect and report an ACTUAL temperature 13 in direct proximity to the component 4.

Such a temperature-control system 1 is shown schematically in FIG. 1 as a functional diagram. A temperature-control fluid 2 flows through the temperature-control device 3 which is designed as a heating device and enters the feed distribution beam 18 through the shared feed part line 6. Here, the temperature-control fluid 2 is fed into two individual feed line parts 6',6", thus entering the two temperature-control assemblies 5',5', which are arranged as heating coils in a component 4 that has been designed as a floor panel. Through each individual return line part 7',7", the temperature-control fluid 2 enters the return distribution beam 19 after intensive heat exchange with the component 4. Between the outlet of the individual return line parts 7',7" and the return distribution beam 19, but preferably as close the component 4 as possible, a return temperature sensor 8,8' is fitted in each of the return line parts 7',7" to measure the return temperature of the temperature-control fluid 2 coming from the relevant temperature-control assembly 5,5'. It is particularly preferred that the return temperature sensors 8,8' and the valves 10,10' with their control elements 11,11' are positioned on or in the individual return line parts 7',7" in direct proximity to the return distribution beam 19 because the control unit 9 should also preferably be positioned here. On one hand, this positioning facilitates accessibility and service for all these devices, while also allowing the installation of particularly short electrical connections between these devices. There is no feed temperature sensor.

The return distribution beam 19 is connected with the temperature-control device 3 through a shared return part line 7. The temperature-control system 1 is monitored and controlled or regulated with the controller 9, which is shown here as an electronic controller and comprises a computer 17 and a memory 16. In this example, a valve 10,10' is installed in each of the two return line parts 7'7" and equipped with a respective control element 11,11'. In the shared feed part line 6, a closing valve 21 is positioned with a corresponding control element 22 and a circulating pump 20. A room temperature sensor 12 measures the ACTUAL temperature 13 in the room using the underfloor heating. All measuring elements 8,8';12, switch elements 11,11';20,22 and peripheral equipment 16,17 are connected operatively with the controller 9 (see dashed lines). The controller 9 is installed in the heating system here (temperature-control device 3), but could also be positioned outside the heater. In the same way, the computer 17 and memory 16 could also be designed to be integrated into the controller.

It is preferable that the controller 9 comprises a memory 16 for saving parameters, wherein the parameters are selected from a group, which comprises at least one TARGET temperature 14, a first temperature window 15, a second temperature window 23, a first, second, third up to n-th closing time ($t_1, t_2, t_3, \ldots, t_n$) and a first, second, third up to m-th opening time ($t_4, t_5, t_6, \ldots, t_m$). It is also preferred that the controller 9 comprises a computer 17 to retrieve and process the parameters from the memory 16 and to monitor the temperature-control system 1.

FIG. 2 shows measured curves and plugging diagrams, which have been obtained with a device as per FIG. 1 during the performance of the method to which the invention relates. The result of a temperature-control method performed on a living room floor with two heating circuits is actually shown here:

The top graph shows the current ACTUAL temperature 13 and the selected TARGET temperature 14 of the living room. The x-coordinate shows the time in hours (approx. 16.30 to approx. 4.30 the next day), while the y-axis shows the room temperature in tenths of a degree Celsius.

The bottom graph shows the return temperatures $RL_1, RL_2$ of the two heating circuits 5,5' as these were recorded by the two return temperature sensors 8,8'. The switch signals are also shown, which the controller 9 transmitted to the two control elements 11,11' to open or close the valves 10,10' (long arrows represent opening or closing of both valves 10,10'; short arrows represent opening or closing of one of the valves 10,10'). The x-coordinate shows the time in hours (approx. 16.30 to approx. 04.30 the next day), while the y-axis shows the temperature in increments of 3° C. The bottom graph shows the control element signals $SG_1$, $SG_2$ for the control elements 11,11' of the two valves 10,10'; wherein the different time points of the changing of these signals (1/0 or 0/1) document that each of the two heating circuits or each of the temperature-control assemblies 5,5' have been controlled autonomously, i.e. independently of the other heating circuit.

At 17.00, the regulation was in balance with temperature deviations of a maximum of 0.1 ° C., both valves 10,10' were closed (situation A).

At approx. 17.15, the TARGET temperature 14 was increased from 20° C. to 22° C.; with a brief delay, both valves 10,10' opened and remained open until approx. 21.30 (situation B). At approx. 21.30, the ACTUAL temperature 13 entered the first temperature window 15, particularly in the first negative temperature difference $\Delta T_2$ (here the TARGET temperature −0.5° C.) of this temperature window 15. The controller 9 immediately commanded the control element 11 to close the valve 10. However, because the ACTUAL temperature 12 fell immediately afterwards by 0.1° C., the valve 10 was reopened.

At approx. 21.45, the controller 9 once again commanded the control element 11 to close the valve 10 and to keep it closed during the first closing time $t_1$; at the same time, the controller 9 commanded the control element 11' to keep the valve 10' open. The closing time $t_1$ here was approx. 15 minutes. Then the controller 9 commanded the control element 11 to open the valve 10 and to keep it open during the first opening time $t_4$; at the same time, the controller 9 commanded the control element 11' to keep the valve 10' open. The opening time $t_4$ here was approx. 10 minutes. This regulation (i.e. the slowing down of the heating effect of the heating loop 5 with the preceding return temperature RLi) was maintained and the control cycles ($t_1$, $t_2$, $t_3$, . . . , $t_n$) and ($t_4$, $t_5$, $t_6$, . . . , $t_m$) were repeated (situation C) until the TARGET temperature 14 was achieved for the first time by the ACTUAL temperature 13 at approx. 02.15. Before the TARGET temperature 14 was achieved, the ACTUAL temperature entered into a second negative temperature difference $\Delta T_4$ (here the TARGET temperature −0.3° C.) of a second temperature window 23. It should be noted here that the controller 9 provides very rapid temperature measurements (for example 1 measurement per 100 milliseconds), that the temperature record took place just 1 time per minute for the purposes of greater clarity of the portrayal, meaning that the measuring point triggering the process at approx. 02.15 was seemingly not even recorded by the temperature record.

As a result, at approx. 02.15, the first negative temperature difference $\Delta T_2$ and also the second negative temperature difference $\Delta T_4$ were exceeded, which prompted the controller 9 to command both control elements 11,11' to close the relevant valve 10,10' (situation D).

At approx. 04.00, the ACTUAL temperature achieved the lower limit of the second negative temperature difference $\Delta T_4$ of 21.7° C., whereupon the controller re-established the regulation (i.e. slowing down of the heating effect of heating loop 5 with the preceding return temperature $RL_1$) (situation E).

At midnight (00.00), the measured external temperature was −6° C.

It should be noted that the automatic equalisation of the two heating circuits occurred without any record of the ACTUAL temperature overshooting the TARGET temperature. By reducing the first temperature window 15 and/or by introducing a second temperature window 23, the maintenance of a stable ACTUAL temperature 13 approximate to the TARGET temperature 14 can be further improved and due to the even lower temperature deviations, the energy efficiency of the heating or cooling system in use can be further improved. The two return temperatures ($RL_1$, $RL_2$) were within a range of 22.5° C. to 34.5° C.

Consequently, it is preferred that if the temperature-control device 3 is designed to heat the temperature-control fluid 2, and if (e.g. when the temperature-control system 1 is switched on) the ACTUAL temperature 13 reported by the room temperature sensor 12 is considerably (e.g. by more than 2° C.) below the first negative temperature difference ($\Delta T_2$), then the controller 9 shall issue the command to keep the valves 10',10 open to the control elements 11',11 of all temperature-control assemblies 5',5 (see also FIG. 2: Change of situation A/B when selecting and implementing a higher TARGET temperature and Situation B). Logically, for cooling systems, it is necessary that the controller 9 issues the command to the control elements 11',11 of all temperature-control assemblies 5',5 to open the valves 10', 10 if the ACTUAL temperature 13 reported by the room temperature sensor 12 is considerably (e.g. by more than 2° C.) above the first positive temperature difference ($\Delta T_1$).

If the temperature-control device 3 is designed to heat the temperature-control fluid 2 and if the ACTUAL temperature 13 reported by the room temperature sensor 12 is still within the first negative temperature difference ($\Delta T_2$), a temperature-control method is preferred, with which the controller 9 will issue the command to close the valve 10,10' for a second closing time ($t_2$) to the control element 11,11' of the temperature-control assembly 5,5' whose return temperature is the highest after the expiration of the first closing time ($t_1$). At practically the same time, the controller 9 issues the command to keep the valves 10',10 open to the control elements 11',11 of the other temperature-control assemblies 5',5 during the second closing time ($t_2$). It is then preferred that the controller 9 issues the command to close the valve 10,10' to the control element 11,11' of the temperature-control assembly 5,5' whose return temperature is the highest for a third closing time ($t_3$) after the expiration of the second closing time ($t_2$), wherein the controller 9 issues the command to keep the valves 10',10 open to the control elements 11',11 of the other temperature-control assemblies 5',5 during the third closing time ($t_3$).

Logically, for cooling systems, it applies that the controller 9 issues the command to close the valve 10,10' to the control element 11,11' of the temperature-control assembly 5,5' whose return temperature is the lowest for a second closing time ($t_2$) after the expiration of the first closing time ($t_1$) if the ACTUAL temperature reported by the room temperature sensor 12 is still within the first positive temperature difference ($\Delta T_1$), wherein the controller 9 issues the command to keep the valves 10',10 open to the control elements 11',11 of the other temperature-control assemblies 5',5 during the second closing time ($t_2$). It is then preferred that the controller 9 issues the command to close the valve 10,10' to the control element 11,11' of the temperature-control assembly 5,5' whose return temperature is the lowest for a third closing time ($t_3$) after the expiration of the second closing time ($t_2$), wherein the controller 9 issues the command to keep the valves 10',10 open to the control elements 11',11 of the other temperature-control assemblies 5',5 during the third closing time ($t_3$).

If the temperature-control device 3 is designed to heat the temperature-control fluid 2, it is preferred that the controller 9 issues the command to close the valves 10,10' to the control elements 11,11' of all temperature-control assemblies (5,5') if the ACTUAL temperature 13 reported by the room temperature sensor 12 is higher than the first negative temperature difference ($\Delta T_2$) after the expiration of the first, second or third closing time ($t_1$,$t_2$,$t_3$). Accordingly, for a cooling system, all valves 10,10' are to be closed if the ACTUAL temperature 13 reported by the room temperature sensor 12 is lower than the first positive temperature difference ($\Delta T_1$) after the expiration of the first, second or third closing time ($t_1$,$t_2$,$t_3$).

The previously described, preferred simpler version of the method pertaining to the invention mainly has the objective of halting the effect of that temperature-control assembly which currently needs to exchange a relatively small amount of thermal energy with the component and leaving the other temperature-control assembly to continue unhindered. After the expiration of a closing time ($t_1$, $t_2$, $t_3$, . . . , $t_n$), the return temperatures of the temperature-control assemblies are reassessed and the algorithm is restarted accordingly.

Up to now, an example temperature-control system 1 with two heating circuits, with therefore (n=2) temperature-control assemblies 5,5', has been described and discussed. In this simple temperature-control system 1 with (n=2) heating circuits, it is always the temperature-control assembly 5, whose return temperature precedes the return temperature of the other temperature-control assembly 5' in the direction of the desired temperature change, which is halted through sporadic closing of its control valve 10. The Control valve 10' of the temperature-control assembly 5', whose return temperature lags behind the return temperature of the other temperature-control assembly 5 in the direction of the desired temperature change, is left open during this time.

The invention in question can also be used with temperature-control systems 1 with more than two heating circuits, namely with (n>2) temperature-control assemblies 5,5'. In doing so, it can be designed that not just the temperature-control assembly 5, whose return temperature precedes the return temperature of the other temperature-control assembly 5' in the direction of the desired temperature change, is halted. In fact, it can be designed that more than one temperature-control assembly 5 up to a maximum of all but one temperature-control assembly 5', namely [1 to (n−1)] temperature-control assemblies 5, are halted through sporadic closing of their control valves 10. In this time, the control valves 10' of [1 to (n−1)] temperature-control assemblies 5' are kept open in turn. It is preferred that the number of n temperature-control assemblies 5,5' is selected from a group which comprises n=2, n=3, n=4, and n=5.

As a practical example for an underfloor heating, a temperature-control system 1 with n=3 (i.e. with n>2) temperature-control assemblies 5,5' is described briefly, wherein this temperature-control system 1 comprises heating circuits N, O and P as temperature-control assemblies 5,5'. A first heating circuit N is labeled as temperature-control assembly 5 and the two other heating circuits O and P are labeled as temperature-control assemblies 5'. In relation to the invention, a differentiation is now normally made between three cases, in which the following should apply as a rule:

1) If the return temperature of heating circuit N precedes both heating circuits O and P by at least 0.1° C. for each, only heating circuit N is halted during a first closing time ($t_1$) and the two other heating circuits O and P remain open during the first closing time ($t_1$).

In addition, the controller 9 will request the return temperatures of the three heating circuits in turn, wherein the return temperature of N is assumed to be the "highest" at first and it is asked whether the return temperature of O is higher than the return temperature of N, and whether the return temperature of P is higher than the return temperature of O. If one of the two questions is answered with "yes", the relevant heating circuit O or P is halted. If these two questions are answered with "no", heating circuit N is halted.

2) If the return temperature of the two heating circuits N and O precede heating circuit P by at least 0.1° C. for each, the two heating circuits N and O are halted during a first closing time ($t_1$) and the other heating circuit P remains open during the first closing time ($t_1$).

In addition, the controller 9 will request the return temperatures of the three heating circuits in turn, wherein the return temperature of N is assumed to be the "lowest" at first and it is asked whether the return temperature of O is lower than the return temperature of N, and whether the return temperature of P is lower than the return temperature of O. If one of the two questions is answered with "yes", the two other heating circuits N and P or N and O are halted. If these two questions are answered with "no", heating circuit N is halted. The return temperatures of heating circuits N, O and P are requested cyclically and are practically repeated at random. The decisive minimum differences of the return temperatures of 0.1° C. have been proven in practice; slightly larger or even smaller minimum differences could also be used.

3) If the ACTUAL temperature 13 deviates from the target temperature 14 by more than 0.3° C., the procedure will follow Rule 1), and if the ACTUAL temperature 13 deviates from the target temperature 14 by 0.3° C. or less, then the procedure will follow Rule 2).

The decisive minimum difference between the ACTUAL temperature 13 and the target temperature 14 of 0.3° C. has been proven in practice; slightly larger or even smaller minimum differences could also be used. This mixed method with the switch between the two previously mentioned, one-sided procedures makes it quicker to achieve a selected room temperature.

A preferred temperature-control method results from these rules for a number of temperature-control assemblies 5,5', for which n is defined as (n>2). To perform this temperature-control method, the controller 9 is programmed in such a way that, in the case of an entering of the ACTUAL temperature 13 into the first temperature window 15, caused by a temperature change and recorded by the room temperature sensor 12, it:

a) issues the command to the control element 11 of an individual temperature-control assembly 5, whose return temperature precedes the return temperatures of the other (n−1) temperature-control assemblies 5' in the direction of the current temperature change, to close the valve 10 for the first closing time ($t_1$) and issues the command to all other (n−1) temperature-control assemblies 5' to keep the valves 10' open during the first closing time ($t_1$); or:

b) issues the command to the control elements 11 of (n−1) temperature-control assemblies 5, whose return temperatures precede the return temperature of an individual temperature-control assembly 5' in the direction of the current temperature change, to close the (n−1) valves 10 for the first closing time ($t_1$) and issues the command to the individual temperature-control assembly 5' to keep the valve 10' open during the first closing time ($t_1$); or:

c) should proceed as per method a) until a deviation of the ACTUAL temperature 13 of 0.3° C. from the target temperature 14 has been achieved and should proceed as per method b) from when the deviation of the ACTUAL temperature 13 of 0.2° C. from the target temperature 14 is achieved.

A particularly preferred version of the method pertaining to the invention makes it possible for all temperature-control assemblies of the system, to replace the temperature-control fluid 2 in the temperature-control assemblies 5,5' before the rerecording and reassessment of return temperatures $RL_1$, $RL_2$. As a result, it is ensured that the effective (dynamic) return temperature of the temperature-control fluid is recorded and not a passive change of the (static) return temperature of the temperature-control fluid caused by the influence of the component or its environment, for example.

Consequently, it is preferred that the method, whose results are shown in FIG. 2, is carried out. This method is characterised in that the controller 9 issues the command to the control elements 11,11' of all temperature-control assemblies 5,5' to open the valves 10,10' for a first opening time ($t_4$) after the expiration of the first closing time ($t_1$).

If the temperature-control device 3 is designed to heat the temperature-control fluid 2, it is further preferred that the controller 9 will issue the command to close the valve 10,10' for a second closing time ($t_2$) to the control element 11,11' of the temperature-control assembly 5,5' whose return temperature is the highest after the expiration of the first opening time ($t_1$), if the ACTUAL temperature reported by the room temperature sensor 12 is still within the first negative temperature difference ($\Delta T_2$), wherein the controller 9 issues the command to keep the valves 10',10 open to the control elements 11',11 of the other temperature-control assemblies 5',5 during the second closing time ($t_2$), and wherein the controller 9 issues the command to the control elements 11,11' of all temperature-control assemblies 5,5' to open the valves 10,10' for a second opening time ($t_5$) after the expiration of the second closing time ($t_2$). It is then preferred that the controller 9 issues the command to close the valve 10,10' to the control element 11,11' of the temperature-control assembly 5,5' whose return temperature is the highest for a third to the n-th closing time ($t_3, \ldots, t_n$) after the expiration of the second opening time ($t_5$), wherein the controller 9 issues the command to keep the valves 10',10 open to the control elements 11',11 of the other temperature-control assemblies 5',5 during the third to the n-th closing time ($t_3, \ldots, t_n$), and wherein the controller 9 issues the command to open the valves 10,10' to the control element 11,11' of all temperature-control assemblies 5,5' for a third to n-th opening time ($t_6, \ldots, t_m$) after the expiration of the third to the n-th closing time ($t_3, \ldots, t_n$). (see FIG. 2: Situation C).

It is particularly preferred that the controller 9 issues the command to close the valves 10,10' to the control elements 11,11' of all temperature-control assemblies 5,5' if the ACTUAL temperature 13 reported by the room temperature sensor 12 is higher than the first negative temperature difference ($\Delta T_2$) after the expiration of the first, second or third opening time ($t_4, t_5, t_6$) (see FIG. 2: Change of situation C/D).

Furthermore, it is preferred that the controller 9 issues the command to open the valves 10,10' to the control elements 11,11' of all temperature-control assemblies 5,5' if the ACTUAL temperature reported by the room temperature sensor 12 is lower than the first negative temperature difference ($\Delta T_2$) after the expiration of the first, second or third opening time ($t_4, t_5, t_6$) (see FIG. 2: Change of situation DIE). Then as already described, the valve 10,10' is always closed for a certain time ($t_1, t_2, t_3, \ldots, t_n$) (see FIG. 2: Situation E).

With both design versions or variations of the temperature-control method pertaining to the invention, it is preferred that the steps of the procedure are repeated until the temperature-control device 3 is deactivated or a new TARGET temperature 14 is predefined for the direct proximity of the component 4 and is implemented in the controller 9.

Logically, for cooling systems, it applies that the controller 9 issues the command to close the valve 10,10' to the control element 11,11' of the temperature-control assembly 5,5' whose return temperature is the lowest for a second closing time ($t_2$) after the expiration of the first opening time ($t_4$) if the ACTUAL temperature 13 reported by the room temperature sensor 12 is still within the first positive temperature difference ($\Delta T_1$), wherein the controller 9 issues the command to keep the valves 10',10 open to the control elements 11',11 of the other temperature-control assemblies 5',5 during the second closing time ($t_2$), and wherein the controller 9 issues the command to open the valves 10,10' to the control elements 11,11' of all temperature-control assemblies 5,5' for a second opening time ($t_5$) after the expiration of the second closing time ($t_2$). It is then preferred that the controller 9 issues the command to close the valve 10,10' to the control element 11,11' of the temperature-control assembly 5,5' whose return temperature is the lowest for a third closing time ($t_3$) after the expiration of the second opening time ($t_5$), wherein the controller 9 issues the command to keep the valves 10',10 open to the control elements 11',11 of the other temperature-control assemblies 5',5 during the third closing time ($t_3$), and wherein the controller 9 issues the command to open the valves 10,10' to the control element 11,11' of all temperature-control assemblies 5,5' for a third opening time ($t_6$) after the expiration of the third closing time ($t_3$).

Furthermore, in the case of cooling systems, it is preferred that the controller 9 issues the command to the control elements 11,11' of all temperature-control assemblies 5,5' to close the valves 10,10' if the ACTUAL temperature 13 reported by the room temperature sensor 12 is lower than the first positive temperature difference ($\Delta T_1$) after the expiration of the first, second or third opening time ($t_4, t_5, t_6$). In addition, it is preferred that the controller 9 issues the command to the control elements 11,11' of all temperature-control assemblies 5,5' to open the valves 10,10' if the ACTUAL temperature reported by the room temperature sensor 12 is higher than the first positive temperature difference ($\Delta T_1$) after the expiration of the first, second or third opening time ($t_4, t_5, t_6$).

The ACTUAL temperature 13 reported by the room temperature sensor 12 could overshoot the predefined TARGET temperature 14, i.e. by exceeding it in the case of heating systems or go below in the case of cooling systems.

As a first measure for such cases, it is preferred that, if the temperature-control device 3 is designed to heat the temperature-control fluid 2, and if the ACTUAL temperature 13 reported by the room temperature sensor 12 is higher than the first negative temperature difference ($\Delta T_2$) after the expiration of the first, second or third closing time ($t_1, t_2, t_3$), the controller 9 issues the command to close the valves 10,10' to the control elements 11,11' of all temperature-control assemblies 5,5'. Logically, for cooling systems, it applies that the command is issued to the control elements 11,11' of all temperature-control assemblies 5,5' to close the valves 10,10' if the ACTUAL temperature 13 reported by the room temperature sensor 12 is lower than the first positive temperature difference ($\Delta T_1$) after the expiration of the first, second or third closing time ($t_1, t_2, t_3$).

As a second measure and to prevent the ACTUAL temperature 13 from considerably overshooting the predefined TARGET temperature 14, it is preferred that the controller 9 issues the command to a control element 22 to close an assigned closing valve 21 which is installed in a shared feed line or feed part line 6, therefore blocking the feed to which a circulating pump 20 is usually also connected. In addition, the preference is that the circulating pump 20 is also deactivated. If the circulation of the temperature-control fluid 2 from, to and in the temperature-control assemblies 5,5' should take place via convection, it is sufficient to close the closing valve 21 to block the shared feed line or feed part line 6. Logically, for cooling systems, a central closing valve 21 will also be closed.

Logically, according to the presented algorithm, a maximum n−1 valves 10 are closed during the closing times ($t_1, t_2, t_3, \ldots, t_n$) with n heating or cooling lines 5. For example, with 3 temperature-control assemblies 5,5', one or two valves 10,10' will be closed during the closing times ($t_1, t_2, t_3, \ldots, t_n$), while one, two or three valves 10,10' will be closed in the case of 4 temperature-control assemblies 5,5'.

To achieve a more refined, automatic coordination of the temperature-control system 1 (i.e. of a heating or cooling system), it is suggested that a second temperature window 23 is defined not comprising the predefined TARGET temperature 14 and only comprising parts of the first temperature window 15 and that this is implemented in the controller 9. In doing so, the second temperature window 23 is defined as a second positive temperature difference ($\Delta T_3$) or as a second negative temperature difference ($\Delta T_4$) to a predefined TARGET temperature 14.

Furthermore, it is preferred, if the temperature-control device 3 is designed to heat the temperature-control fluid 2 and if the ACTUAL temperature 13 reported by the room temperature sensor 12 is lower than the second negative temperature difference ($\Delta T_4$) after the expiration of the first, second or third closing time ($t_1, t_2, t_3$), that the controller 9 issues the command to open the valves 10,10' to the control elements 11,11' of all temperature-control assemblies 5,5' (see E). Furthermore, it is preferred that the controller 9 issues the command to close the valve 10,10' for an n-th closing time ($t_n$) if the ACTUAL temperature 13 reported by the room temperature sensor 12 is within the second negative temperature difference ($\Delta T_4$) after the expiration of the first, second or third closing time ($t_1, t_2, t_3$) to the control element 11,11' of the temperature-control assembly 5,5' whose return temperature is highest, wherein the controller 9 issues the command to the control elements 11',11 of the other temperature-control assemblies 5',5 to keep the valves 10',10 open during the n-th closing time ($t_n$).

In addition, it is preferred that the controller 9 issues the command to close the valves 10,10' to the control elements 11,11' of all temperature-control assemblies 5,5' if the ACTUAL temperature 13 reported by the room temperature sensor 12 is higher than the second negative temperature difference ($\Delta T_4$) after the expiration of the first, second, third or n-th closing time ($t_1, t_2, t_3, \ldots, t_n$).

Logically, for cooling systems, it applies that the controller 9 issues the command to the control elements 11,11' of all temperature-control assemblies 5,5' to open the valves 10,10' if the ACTUAL temperature 13 reported by the room temperature sensor 12 is higher than the second positive temperature difference ($\Delta T_3$) after the expiration of the first, second or third closing time ($t_1, t_2, t_3$). Furthermore, it is preferred that the controller 9 issues the command to close the valve 10,10' for an n-th closing time ($t_n$) if the ACTUAL temperature 13 reported by the room temperature sensor 12 is within the second positive temperature difference ($\Delta T_3$) after the expiration of the first, second or third closing time ($t_1, t_2, t_3$) to the control element 11,11' of the temperature-control assembly 5,5' whose return temperature is lowest, wherein the controller 9 issues the command to the control elements 11',11 of the other temperature-control assemblies 5',5 to keep the valves 10',10 open during the n-th closing time ($t_n$). In addition, it is also preferred that the controller 9 issues the command to the control elements 11,11' of all temperature-control assemblies 5,5' to close the valves 10,10' if the ACTUAL temperature 13 reported by the room temperature sensor 12 is lower than the second positive temperature difference ($\Delta T_3$) after the expiration of the first, second or third closing time ($t_1, t_2, t_3$).

Logically, according to the presented, improved algorithm, a maximum o−1 valves 10 are closed during the closing times ($t_1, t_2, t_3, \ldots, t_n$) and o valves are kept open during the opening times ($t_4, t_5, t_6, \ldots, t_m$) with o heating or cooling lines 5.

The preferred closing times ($t_1, t_2, t_3, \ldots, t_n$) amount to 2 to 30 minutes and the preferred opening times ($t_4, t_5, t_6, \ldots, t_m$) amount to 1 to 20 minutes, wherein closing times of 5 to 20 minutes and opening times of 2 to 15 minutes are particularly preferred and closing times of 10 to 15 minutes and opening times of 5 to 10 minutes are particularly preferred.

A preferred first positive temperature difference ($\Delta T_1$) is 0.1 to 2° C., particularly preferred is 0.1 to 1° C. and especially preferred is 0.1 to 0.3° C. A preferred first negative temperature difference ($\Delta T_2$) is 0.1 to 4° C., particularly preferred is 0.1 to 2° C. and especially preferred is 0.1 to 0.5° C. A preferred second positive temperature difference ($\Delta T_3$) is 0.1 to 1° C., particularly preferred is 0.1 to 0.5° C. and especially preferred is 0.1 to 0.2° C. A preferred second negative temperature difference ($\Delta T_4$) is 0.1 to 2° C., particularly preferred is 0.1 to 1° C. and especially preferred is 0.1 to 0.2° C.

The same reference signs relate to the appropriate features of the device.

REFERENCE LIST

| | |
|---|---|
| 1 | Temperature-control system |
| 2 | Temperature-control fluid |
| 3 | Temperature-control device |
| 4 | Component |
| 5, 5' | Temperature-control assembly |
| 6 | Shared feed line |
| | Shared feed part line |
| 6', 6" | Individual feed line parts |
| 7 | Shared return line |
| | Shared return part line |
| 7', 7" | Individual return line parts |
| 8, 8' | Return temperature sensor |
| 9 | Controller |
| 10, 10' | Valve |
| 11, 11' | Control element |
| 12 | Room temperature sensor |
| 13 | ACTUAL temperature |
| 14 | TARGET temperature |
| 15 | First temperature window |
| 16 | Memory |
| 17 | Computer |
| 18 | Feed distribution beam |
| 19 | Return distribution beam |
| 20 | Circulating pump |
| 21 | Closing valve |
| 22 | Control element to 21 |
| 23 | Second temperature window |
| $t_1$ | First closing time |
| $t_2$ | Second closing time |
| $t_3$ | Third closing time |
| $t_n$ | n-th closing time |
| $t_4$ | First opening time |
| $t_5$ | Second opening time |
| $t_6$ | Third opening time |
| $t_m$ | m-th opening time |
| $\Delta T_1$ | 1st positive temperature difference |
| $\Delta T_2$ | 1st negative temperature difference |
| $\Delta T_3$ | 2nd positive temperature difference |
| $\Delta T_4$ | 2nd negative temperature difference |
| $RL_1$ | Return temperature of 5, 8 |
| $RL_2$ | Return temperature of 5', 8' |
| $SG_1$ | Switch signal for 11 |
| $SG_2$ | Switch signal for 11' |

The invention claimed is:

1. Method for the temperature control of a component, for which a temperature-control system (1) is provided, which comprises:
   a) a temperature-control device (3) designed to heat or cool a temperature-control fluid (2);
   b) at least two, i.e. (n≥2) temperature-control assemblies (5,5') designed to conduct a temperature-control fluid (2) through a component (4) to be temperature-controlled and which are connected through (n≥2) individual feed line parts (6',6") and through (n≥2) individual return line parts (7',7") with the temperature-control device (3), wherein each of the (n≥2) individual return line parts (7',7") comprises its own return temperature sensor (8,8') to measure the individual return temperature of the temperature-control fluid (2) from the relevant temperature-control assembly (5,5'); and c) a controller (9), which comprises valves (10,10') with control elements (11,11') positioned in the (n≥2) individual feed line parts (6',6") or (n≥2) return line parts (7',7"), which are designed to adjust an opening degree of the respectively related valve (10,10'), wherein the controller (9) is designed to control the control elements (11,11') and to read the return temperature sensor (8,8') and comprises a room temperature sensor (12) to detect and report an ACTUAL temperature (13) in direct proximity to the component (4);

wherein the temperature-control method is characterised in that:

i) no feed temperature sensors being used;

ii) a TARGET temperature (14) being predefined for the direct proximity of the component (4);

iii) an initial temperature window (15) not comprising the predefined TARGET temperature (14) being defined as the first positive temperature difference ($\Delta T_1$) for a cooling of component (4) or as a first negative temperature difference ($\Delta T_2$) for heating of component (4) to the predefined TARGET temperature (14) and being implemented in the controller (9); and iv) the controller (9) issuing the command to the control element (11) of an individual temperature-control assembly (5), whose return temperature precedes the return temperatures of the other temperature-control assemblies (5') in the direction of a current temperature change, to close the valve (10) for a first closing time ($t_1$) in the case of an entering of the ACTUAL temperature (13) into the first temperature window (15), caused by the temperature change and recorded by the room temperature sensor (12), wherein the controller (9) issues the command to the control elements (11') of the other temperature-control assemblies (5') to keep the valves (10') open during the first closing time ($t_1$).

2. Temperature-control method in accordance with claim 1, characterised in that a number of (n) temperature-control assemblies (5,5') is selected from a group which comprises (n=2), (n=3), (n=4), and (n =5) temperature-control assemblies (5,5').

3. Temperature-control method in accordance with claim 2, characterised in that the number (n) of temperature-control assemblies (5,5') is defined as (n>2), wherein the controller (9) is programmed in such a way that, in the case of an entering of the ACTUAL temperature (13) into the first temperature window (15), caused by a temperature change and recorded by the room temperature sensor (12), it:

a) issues the command to the control element (11) of an individual temperature-control assembly (5), whose return temperature precedes the return temperatures of the other (n−1) temperature-control assemblies (5') in the direction of the current temperature change, to close the valve (10) for the first closing time ($t_1$) and issues the command to all other (n−1) temperature-control assemblies (5') to keep the valves (10') open during the first closing time ($t_1$);

or:

b) issues the command to the control element (11) of (n−1) temperature-control assemblies (5), whose return temperatures precede the return temperature of an individual temperature-control assembly (5') in the direction of the current temperature change, to close the (n−1) valves (10) for the first closing time ($t_1$) and issues the command to the individual temperature-control assembly (5') to keep the valve (10') open during the first closing time ($t_1$);

or:

c) should proceed as per method a) until a deviation of the ACTUAL temperature (13) of 0.3° C. from the target temperature (14) has been achieved and should proceed as per method b) from when the deviation of the ACTUAL temperature (13) of 0.2° C. from the target temperature (14) is achieved.

4. Temperature-control method in accordance with claim 1, characterised in that the controller (9) issues the command to the control elements (11,11') of all, i.e. (n), temperature-control assemblies (5,5') to open the valves (10,10') for a first opening time ($t_4$) after the expiration of the first closing time ($t_1$), and if the temperature-control device (3) is designed to heat the temperature-control fluid (2) and if the ACTUAL temperature (13) reported by the room temperature sensor (12) is still within the first negative temperature difference ($\Delta T_2$), the controller (9) issues the command to close the valve (10) to the control element (11) of an individual temperature-control assembly (5) whose return temperature is the highest for a second closing time ($t_2$) after the expiration of the first closing time ($t_1$) and after the expiration of the first opening time ($t_4$), wherein the controller (9) issues the command to keep the valves (10') open to the control elements (11') of the other temperature-control assemblies (5') during the second closing time ($t_2$).

5. Temperature-control method in accordance with claim 4, characterised in that the controller (9), after the expiration of the second closing time ($t_2$), issues the command to open the valves (10,10') to the control elements (11,11') of all (n) temperature-control assemblies (5,5') for a second opening time ($t_5$) after the expiration of the second closing time ($t_2$), and, after the expiration of the second opening time ($t_5$), issues the command to close the valve (10) for a third closing time ($t_3$) to the control element (11) of an individual temperature-control assembly (5) whose return temperature is the highest, wherein the controller (9) issues the command to keep the valves (10') open to the control elements (11') of the other temperature-control assemblies (5') during the third closing time ($t_3$).

6. Temperature-control method in accordance with claim 5, characterised in that these method steps are repeated until an n-th closing time $t_n$ or an m-th opening time $t_m$.

7. Temperature-control method in accordance with claim 5, characterised in that the controller (9) issues the command to open the valves (10,10') to the control elements (11,11') of all (n) temperature-control assemblies (5,5') for a third opening time ($t_6$) after the expiration of the third closing time ($t_3$).

8. Temperature-control method in accordance with claim 7, characterised in that if the ACTUAL temperature (13) reported by the room temperature sensor (12) is above the first negative temperature difference ($\Delta T_2$) window after the expiration of the first, second, third or m-th opening time ($t_4$, $t_5$, $t_6$, . . . , $t_m$), the controller (9) will issue the command to close the valves (10,10') to the control elements (11,11') of all (n) temperature-control assemblies (5,5').

9. Temperature-control method in accordance with claim 7, characterised in that if the ACTUAL temperature reported by the room temperature sensor (12) is below the first negative temperature difference ($\Delta T_2$) window after the expiration of the first, second, third or m-th opening time ($t_4$, $t_5$, $t_6$, . . . , $t_m$), the controller (9) will issue the command to open the valves (10,10') to the control elements (11,11') of all (n) temperature-control assemblies (5,5').

10. Temperature-control method in accordance with claim 7, characterised in that these method steps are repeated until the temperature-control device (3) is deactivated or a new TARGET temperature (14) is predefined for the direct proximity of the component (4) and is implemented in the controller (9).

11. Temperature-control method in accordance with claim 6, characterised in that if the temperature-control device (3) is designed to heat the temperature-control fluid (2) and if the ACTUAL temperature (13) reported by the room temperature sensor (12) is above the first negative temperature difference ($\Delta T_2$) window after the expiration of the first, second, third or n-th closing time ($t_1$, $t_2$, $t_3$, . . . $t_n$), the controller (9) will issue the command to close the valves (10,10') to the control elements (11,11') of all (n) temperature-control assemblies (5,5').

12. Temperature-control method in accordance with claim 6, characterised in that a second temperature window (23) is defined not comprising the predefined TARGET temperature (14) and only comprising parts of the first temperature window (15) and that this is implemented in the controller (9), wherein the second temperature window (23) is defined as a second positive temperature difference ($\Delta T_3$) or as a second negative temperature difference ($\Delta T_4$) to the predefined TARGET temperature (14).

13. Temperature-control method in accordance with claim 12, characterised in that if the temperature-control device (3) is designed to heat the temperature-control fluid (2) and if the ACTUAL temperature (13) reported by the room temperature sensor (12) below the second negative temperature difference ($\Delta T_4$) window after the expiration of the first, second, third or n-th closing time ($t_1$, $t_2$, $t_3$, . . . $t_n$), the controller (9) will issue the command to open the valves (10,10') to the control elements (11,11') of all (n) temperature-control assemblies (5,5').

14. Temperature-control method in accordance with claim 12, characterised in that if the temperature-control device (3) is designed to heat the temperature-control fluid (2) and if the ACTUAL temperature (13) reported by the room temperature sensor (12) is within the second negative temperature difference ($\Delta T_4$) after the expiration of the first, second or third closing time ($t_1$, $t_2$, $t_3$, . . . $t_n$), the controller (9) issues the command to close the valve (10) to the control element (11) of an individual temperature-control assembly (5) whose return temperature is the highest for an n-th closing time ($t_n$), wherein the controller (9) issues the command to keep the valves (10') open to the control elements (11') of the other temperature-control assemblies (5') during the n-th closing time ($t_n$).

15. Temperature-control method in accordance with claim 12, characterised in that if the temperature-control device (3) is designed to heat the temperature-control fluid (2) and if the ACTUAL temperature (13) reported by the room temperature sensor (12) is above the second negative temperature difference ($\Delta T_4$) window after the expiration of the first, second or third closing time ($t_1$, $t_2$, $t_3$) , the controller (9) issues the command to the control elements (11,11') of all (n) temperature-control assemblies (5,5') to close the valves (10,10').

* * * * *